United States Patent
Hara et al.

(10) Patent No.: US 12,466,316 B2
(45) Date of Patent: Nov. 11, 2025

(54) NOTIFICATION CONTROL DEVICE AND NOTIFICATION CONTROL METHOD

(71) Applicants: TOYOTA JIDOSHA KABUSHIKI KAISHA, Toyota (JP); DENSO CORPORATION, Kariya (JP)

(72) Inventors: Kenichiroh Hara, Yokohama (JP); Jiro Fujino, Toyota (JP); Satoru Kawakami, Tokyo-to (JP); Hiroshi Morimoto, Tokyo-to (JP); Kenta Yamada, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 53 days.

(21) Appl. No.: 18/643,752

(22) Filed: Apr. 23, 2024

(65) Prior Publication Data
US 2024/0375583 A1  Nov. 14, 2024

(30) Foreign Application Priority Data
May 9, 2023 (JP) .................. 2023-077399

(51) Int. Cl.
| | | |
|---|---|---|
| G08B 21/06 | (2006.01) | |
| B60Q 9/00 | (2006.01) | |
| G06F 3/01 | (2006.01) | |

(52) U.S. Cl.
CPC .............. *B60Q 9/00* (2013.01); *G06F 3/013* (2013.01)

(58) Field of Classification Search
USPC ....... 340/439, 435, 436, 438, 443, 463, 488, 340/539.13, 539.22, 572.1, 588, 691.6
See application file for complete search history.

(56) References Cited

U.S. PATENT DOCUMENTS

| | | | |
|---|---|---|---|
| 2019/0308554 A1* | 10/2019 | Tsukao | B60Q 9/00 |
| 2020/0391760 A1* | 12/2020 | Reschke | B60W 50/14 |
| 2021/0192974 A1* | 6/2021 | Tsunoda | G09B 19/16 |
| 2021/0197668 A1* | 7/2021 | Tian | B60K 35/81 |
| 2021/0221396 A1* | 7/2021 | Awano | B60K 35/22 |
| 2023/0271604 A1* | 8/2023 | St. Gray | B60W 50/14 701/26 |
| 2024/0253657 A1* | 8/2024 | Sekine | B60K 35/654 |

FOREIGN PATENT DOCUMENTS

| | | |
|---|---|---|
| JP | 2009-251744 A | 10/2009 |
| JP | 2017-142621 A | 8/2017 |
| JP | 2019-185218 A | 10/2019 |

\* cited by examiner

*Primary Examiner* — Daniel Previl
(74) *Attorney, Agent, or Firm* — Oliff PLC

(57) ABSTRACT

A notification control device is configured to, when the number of objects requiring attention present in surroundings of a vehicle is less than or equal to a predetermined number, respectively set virtual planes on which the objects are projected at positions of the objects so as to face the vehicle and notify a driver to inform him or her of the presence of an object requiring attention if the field of vision of the driver does not overlap a projected location of the object on the virtual plane during a predetermined period from when detecting that object for greater than or equal to a predetermined recognition judgment time, and, when the number of the objects is larger than the predetermined number, not notify the driver in that way.

6 Claims, 7 Drawing Sheets

NOTIFICATION CONTROL DEVICE AND NOTIFICATION CONTROL METHOD

FIELD

The present invention relates to a notification control device and a notification control method.

BACKGROUND

Japanese Unexamined Patent Publication No. 2019-185218 discloses a conventional warning device able to report a state of attention of a driver configured so as to calculate a point which a driver is paying attention to based on gaze information showing the direction of a gaze of the driver and eyeball position information showing the position of an eyeball of the driver in a three-dimensional coordinate system, judge whether the driver is paying attention to an object based on the object requiring attention and the point of attention, and report when it is judges attention is not being paid.

SUMMARY

If there are a plurality of objects requiring attention at the outside of a vehicle, it is assumed that the driver will turn his or hers gaze to all of the objects without omission to obtain a grasp of the positions etc. of those objects without fixing his or hers gaze on any one object among them. For this reason, in the above-mentioned conventional warning device, if there are a plurality of objects requiring attention at the outside of the vehicle, despite the driver obtaining a grasp of all of the objects, a notification (warning) regarding one object requiring attention among them is liable to be made due to the driver's gaze not turning to it and the driver is liable to end up feeling bothered by that notification.

The present invention was made focusing on such an issue and has as its object to keep a notification regarding an object requiring attention from causing a driver to feel bothered.

The gist of the present disclosure is as follows:

(1) A notification control device configured to notify a driver, wherein the notification control device is configured to: detect objects requiring attention present in surroundings of a vehicle based on surrounding data showing a situation in surroundings of the vehicle; set a field of vision of the driver based on driver data showing a condition of the driver; when the number of the objects is less than or equal to a predetermined number, respectively set virtual planes on which the objects are projected at positions of the objects so as to face the vehicle and notify the driver to inform him or her of the presence of an object requiring attention if the field of vision of the driver does not overlap a projected location of the object on the virtual plane during a predetermined period from when detecting that object for greater than or equal to a predetermined recognition judgment time; and, when the number of the objects is larger than the predetermined number, not notify the driver in that way.

(2) A notification control device configured to notify a driver, wherein the notification control device is configured to: detect objects requiring attention present in surroundings of a vehicle based on surrounding data showing a situation in surroundings of the vehicle; set a field of vision of the driver based on driver data showing a condition of the driver; respectively set virtual planes on which the objects are projected at positions of the objects so as to face the vehicle and judge that an object has been recognized by the driver if the field of vision of the driver overlaps a projected location of the object on the virtual plane during a predetermined period from when detecting that object for greater than or equal to a predetermined recognition judgment time; if there is an object not recognized by the driver among the detected objects, notify the driver to inform him or her of the presence of an object requiring attention; and when the number of the objects detected is large, shorten the recognition judgment time compared to when it is small.

(3) The notification control device according to the above (2), wherein the notification control device is configured to: make the recognition judgment time a second judgment time when the number of the objects is less than or equal to a predetermined number; and make the recognition judgment time a first judgment time smaller than the second judgment time when the number of the objects is greater than the predetermined number.

(4) The notification control device according to the above (1) or the above (2), wherein the notification control device is configured to correct the number of detected objects by a weighting coefficient set for each type of object.

(5) A notification control method by a notification control device notifying information to a driver, wherein the notification control method comprises: detecting objects requiring attention present in surroundings of a vehicle based on surrounding data showing a situation in surroundings of the vehicle; setting a field of vision of the driver based on driver data showing a condition of the driver; when the number of the objects is less than or equal to a predetermined number, respectively setting virtual planes on which the objects are projected at positions of the objects so as to face the vehicle and notifying the driver to inform him or her of the presence of an object requiring attention if the field of vision of the driver does not overlap a projected location of the object on the virtual plane during a predetermined period from when detecting that object for greater than or equal to a predetermined recognition judgment time; and, when the number of the objects is larger than the predetermined number, not notifying the driver in that way.

(6) A notification control method by a notification control device notifying information to a driver, wherein the notification control method comprises: detecting objects requiring attention present in surroundings of a vehicle based on surrounding data showing a situation in surroundings of the vehicle; setting a field of vision of the driver based on driver data showing a condition of the driver; respectively setting virtual planes on which the objects are projected at positions of the objects so as to face the vehicle and judging that an object has been recognized by the driver if the field of vision of the driver overlaps a projected location of the object on the virtual plane during a predetermined period from when detecting that object for greater than or equal to a predetermined recognition judgment time; if there is an object not recognized by the driver among the detected objects, notifying the driver to inform him or her of the presence of an object requiring attention; and, when the number of the objects detected is large, shortening the recognition judgment time compared to when it is small.

According to these aspects of the present invention, if there are a large number of objects requiring attention outside of a vehicle, a driver can be kept from ending up being unnecessarily warned, therefore notifications regarding those objects can be kept from causing the driver to feel bothered.

DESCRIPTION OF EMBODIMENTS

Below, embodiments of the present invention will be explained in detail with reference to the drawings. Note that in the following explanation, similar component elements will be assigned the same reference notations.

First Embodiment

Figure 1:
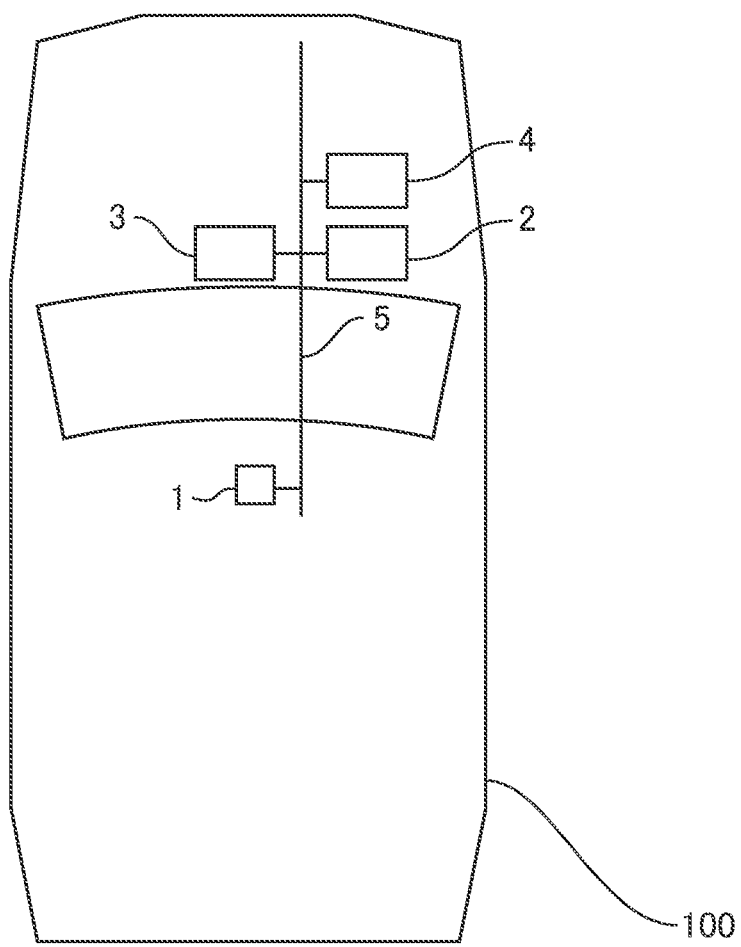
FIG. 1 is a schematic view of the system of a vehicle according to a first embodiment of the present invention.

FIG. 1 is a schematic view of a system configuration of a vehicle 100 according to a first embodiment of the present invention.

The vehicle 100 is provided with a surrounding sensor 1, driver sensor 2, output device 3, and control device 4. The surrounding sensor 1, driver sensor 2, output device 3, and control device 4 are connected to be able to communicate through an internal vehicle network 5 based on the Controller Area Network standard. The vehicle 100 may be a vehicle equipped with an automated driving function or driver's assistance function or may be a manually driven vehicle.

The surrounding sensor 1 is a sensor for generating surrounding data showing the situation around the vehicle 100. In the present embodiment, as the surrounding sensor 1, one or more external cameras for capturing the surroundings of the vehicle 100 are provided. An external camera captures the surroundings of the vehicle 10 by a predetermined frame rate (for example, 10 Hz to 40 Hz) and generates surrounding images in which the surroundings of the vehicle 100 are reflected. The external camera sends the generated surrounding images as surrounding data to the control device 4 each time generating surrounding images.

Note that instead of an external camera or in addition to an external camera, it is also possible to provide as a surrounding sensor 1 a distance measurement sensor for measuring the distance up to another vehicle or pedestrian, bicycle, or other object present around the vehicle 100. As an example of a distance measurement sensor, for example, a lidar (light detection and ranging device) for emitting laser light and measuring distance based on its reflected light, a millimeter wave radar sensor for emitting an electromagnetic wave and measuring distance based on its reflected wave, etc. may be mentioned.

The driver sensor 2 is a sensor for generating driver data showing the state of a driver. In the present embodiment, as the driver sensor 2, a driver monitor camera is provided for capturing the appearance of the driver, including the face of the driver. The driver monitor camera captures the appearance of the driver by a predetermined frame rate (for example, 10 Hz to 40 Hz) and generates external images in which the appearance of the driver is reflected. The driver monitor camera sends the generated external images as driver data to the control device 4 each time generating external images of the driver.

The output device 3 is a device for notifying information to a driver through physical senses of the driver of the vehicle 100 (for example, sight, hearing, touch, etc.) In the present embodiment, as the output device 3, a display arranged at a position which the driver can view (for example, instrumentation display, center display, heads up display, etc.) and a speaker are provided. The display displays information corresponding to a display signal output from the control device 4 (for example, text information or image information). The speaker outputs audio corresponding to an audio signal output from the control device 4.

The control device 4 is an ECU (electronic control unit) provided with a communication part 41, storage part 42, and processing part 43 (see FIG. 2) and is configured to at least be able to identify objects outside the vehicle requiring attention to (objects requiring attention) and notify the driver about the objects through the output device 3 in accordance with the state of recognition of the objects by the driver. The control device 4 can receive, as input, in addition to the above-mentioned surrounding data and driver data, in accordance with need, for example, vehicle position data acquired by a position measuring sensor, vehicle speed data acquired by a vehicle speed sensor, or other various types of data.

Figure 2:
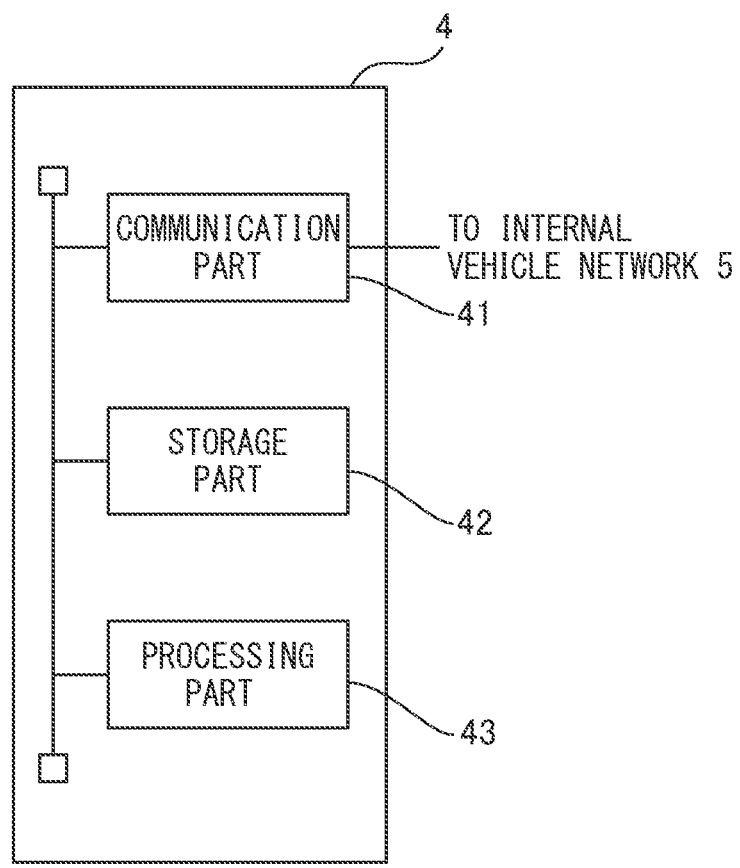
FIG. 2 is a view showing a hardware configuration of a control device.

FIG. 2 is a view showing the hardware configuration of the control device 4.

The control device 4 is provided with a communication part 41, storage part 42, and processing part 43.

The communication part 41 is provided with an interface circuit for connecting the control device 4 to an internal vehicle network 5. The communication part 41 supplies the data received from the outside (surrounding data, driver data, etc.) to the processing part 43. Further, the communication part 41 sends the display signal and audio signal output from the processing part 43 to the output device 3.

The storage part 42 has a HDD (hard disk drive) or SSD (solid state drive) or semiconductor memory or other storage medium and stores various computer programs and data etc. used for processing at the processing part 43.

The processing part 43 has one or more CPUs (central processing units) and their peripheral circuits and runs various computer programs stored in the storage part 42, for example, is a processor. Below, referring to FIG. 3, one example of the processing for notification as one of the processing operations performed by the processing part 43 and in turn by the control device 4 will be explained.

Figure 3:
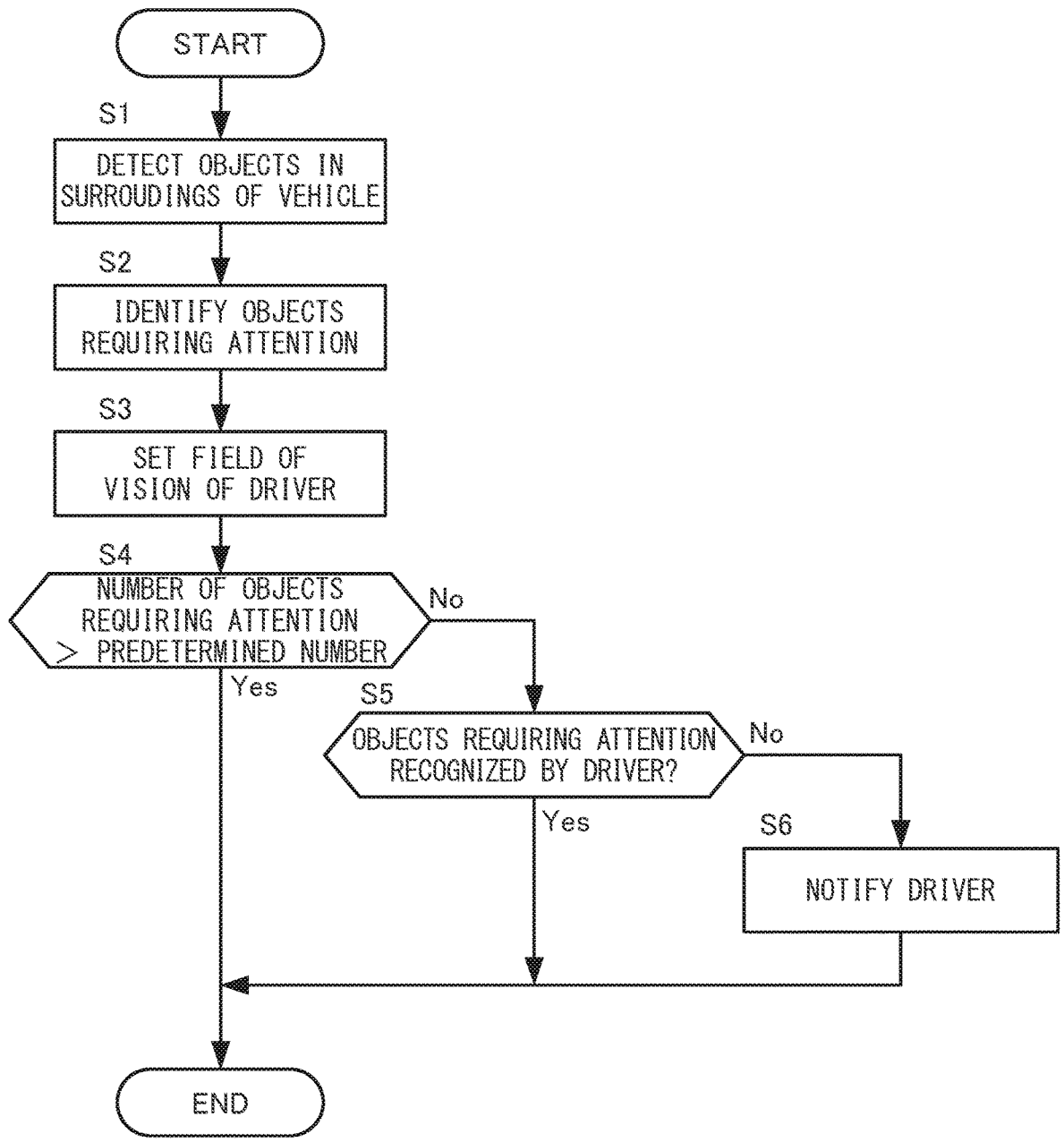
FIG. 3 is a flow chart for explaining details of processing for notification according to the first embodiment of the present invention.

FIG. 3 is a flow chart for explaining details of the notification processing according to the present embodiment.

At step S1, the control device 4 detects objects present in the surroundings of the vehicle 100 based on surrounding data received from the surrounding sensor 1, specifically the surrounding images received from an external camera.

In the present embodiment, the control device 4 successively inputs surrounding images received from the external camera into a classifier and detects the regions in which objects are shown in the surrounding images and the types of the objects shown in those regions. The classifier, for example, can be made a convolutional neural network (CNN) having a plurality of convolution layers connected in series from the input side to the output side. Further, the control device 4 uses the standard sizes of the objects stored in the storage part 42 for each type of object and the size of an object detected at the surrounding images to estimate the distance from the external camera the object and follows (tracks) the object detected at the surrounding images along a time series to calculate the position and speed of the object. Note that the method of detection of the object is not limited to such a method. Various known techniques may be used for detection.

At step S2, the control device 4 identifies objects for which attention is required (below, referred to as "objects requiring attention") among the objects present in the surroundings of the vehicle 100. The objects requiring attention can, for example, be other vehicles, pedestrians, bicycles, and other objects approaching the vehicle 100, that is, objects which may collide with the vehicle 100. However, the invention is not limited to this. For example, pedestrians, bicycles, and other predetermined objects decided on in advance may also be identified as objects requiring attention or objects with distances from the vehicle 100 in a direction perpendicular to direction of advance of the vehicle 100 (lateral direction) smaller than a predetermined threshold value may also be identified as objects requiring attention.

At step S3, the control device 4 sets a field of vision of the driver based on the driver data received from the driver sensor 2, specifically, the image of the appearance of the driver received from the driver monitor camera.

Figure 4:
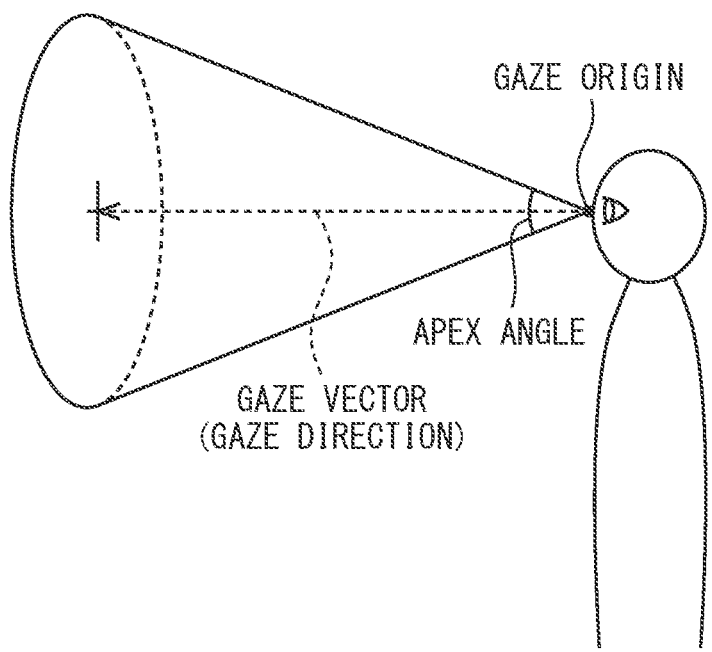
FIG. 4 is a view for explaining a field of vision of a driver.

In the present embodiment, the control device 4 successively processes the facial images received from the driver monitor camera 21 to thereby detect the position of the center of a pupil forming the moving point (that is, the gaze origin of the driver) and the Purkinje image (corneal reflected image) forming the reference point and detects the gaze direction of the driver based on the positional relationship of the Purkinje image and center of the pupil (position of moving point with respect to reference point). Further, the control device 4, as shown in FIG. 4, sets a viewing cone having a gaze origin of the driver as its apex, having a gaze vector extending from the gaze origin toward the gaze direction as its center axis, and having a predetermined apex angle (angle of view) as the field of vision of the driver.

Note that the method of setting the field of vision of the driver is not limited to such a method. It may be set by various known methods. Further, in the present embodiment, as shown in FIG. 4, the shape of the field of vision was made a circular cone, but the shape of the field of vision is not limited to a circular cone and may also be an elliptical cone or polygonal cone or other cone. Further, the viewing cone shown in FIG. 4 was a so-called "right circular cone" with a center axis running through the center of gravity of the base, but it may also be a so-called "oblique circular cone" with a center axis not running through the center of gravity of the base.

At step S4, the control device 4 judges whether the number of objects which require attention (below, "number of objects requiring attention") Nobj is larger than a preset predetermined number Nth.

As explained above, if there are a plurality of objects requiring attention at the outside of the vehicle 100, if the number of objects requiring attention Nobj increases, it is assumed that the driver will turn his or hers gaze to all of the objects without omission to obtain a grasp of the positions etc. of those objects without fixing his or hers gaze on any one object among them. Therefore, if notifying (warning) the driver about objects requiring attention without restraint just because the driver does not turn his or hers gaze to one object among the plurality of objects, the notification will be made despite the driver turning his or hers gaze to all of the objects requiring attention to obtain a grasp of them all or despite being able to obtain a grasp of all of the objects requiring attention and the driver is liable to end up feeling bothered by the notification.

Therefore, in the present embodiment, it was decided to have the control device judge whether the number of objects requiring attention Nobj is larger than a predetermined number Nth and if the number of objects requiring attention Nobj is larger than the predetermined number Nth, end the current processing without notifying the driver of objects requiring attention whether or not there are objects requiring attention in the field of vision of the driver. Further, it was decided that if the number of objects requiring attention Nobj is less than or equal to the predetermined number Nth, the control device should proceed to the processing of step S5 and judge the necessity of notifying the driver of an object requiring attention by confirming whether there is an object requiring attention in the field of vision of the driver.

Due to this, if there is a large number of objects requiring attention at the outside of the vehicle 100, it is possible to keep an object requiring attention from being notified despite the driver being right of the middle of turning his or hers gaze to the objects requiring attention to obtain a grasp of them or despite having obtained a grasp of the objects requiring attention. Therefore, if there is a large number of objects requiring attention at the outside of the vehicle 100, it is possible to keep the driver from ending up being unnecessarily warned.

Note that, in the present embodiment, the predetermined number Nth is made 6, but it may also be another number. Further, in the present embodiment, the number of objects requiring attention Nobj is made just the number of objects. For example, when four pedestrians are detected as objects requiring attention and one bicycle is detected, the number of objects requiring attention Nobj becomes 5. However, the invention is not limited to this. For example, for pedestrians, the number of objects per person is made 1, while for bicycles, the number of objects per cycle is made 2 etc. It is also possible to calculate the number of objects requiring attention Nobj after weighting it in accordance with the type of object. That is, the number of objects may be corrected by a weighting coefficient set as the type of the object. In the case of this example, the weighting coefficient for pedestrians is 1 while the weighting coefficient for bicycles is 2. Therefore, when four pedestrians are detected as objects requiring attention and one bicycle is detected, the number of objects requiring attention Nobj becomes 6 (=4 persons×weighting coefficient 1+1 bicycle×weighting coefficient 2).

At step S5, the control device 4 judges whether objects requiring attention have been recognized by the driver. When the driver has recognized the objects requiring attention, the control device 4 ends the current processing without any notifications regarding objects requiring attention. On the other hand, when the driver has not recognized even one of the objects requiring attention, the control device 4 proceeds to the processing of step S6.

Figure 5A:
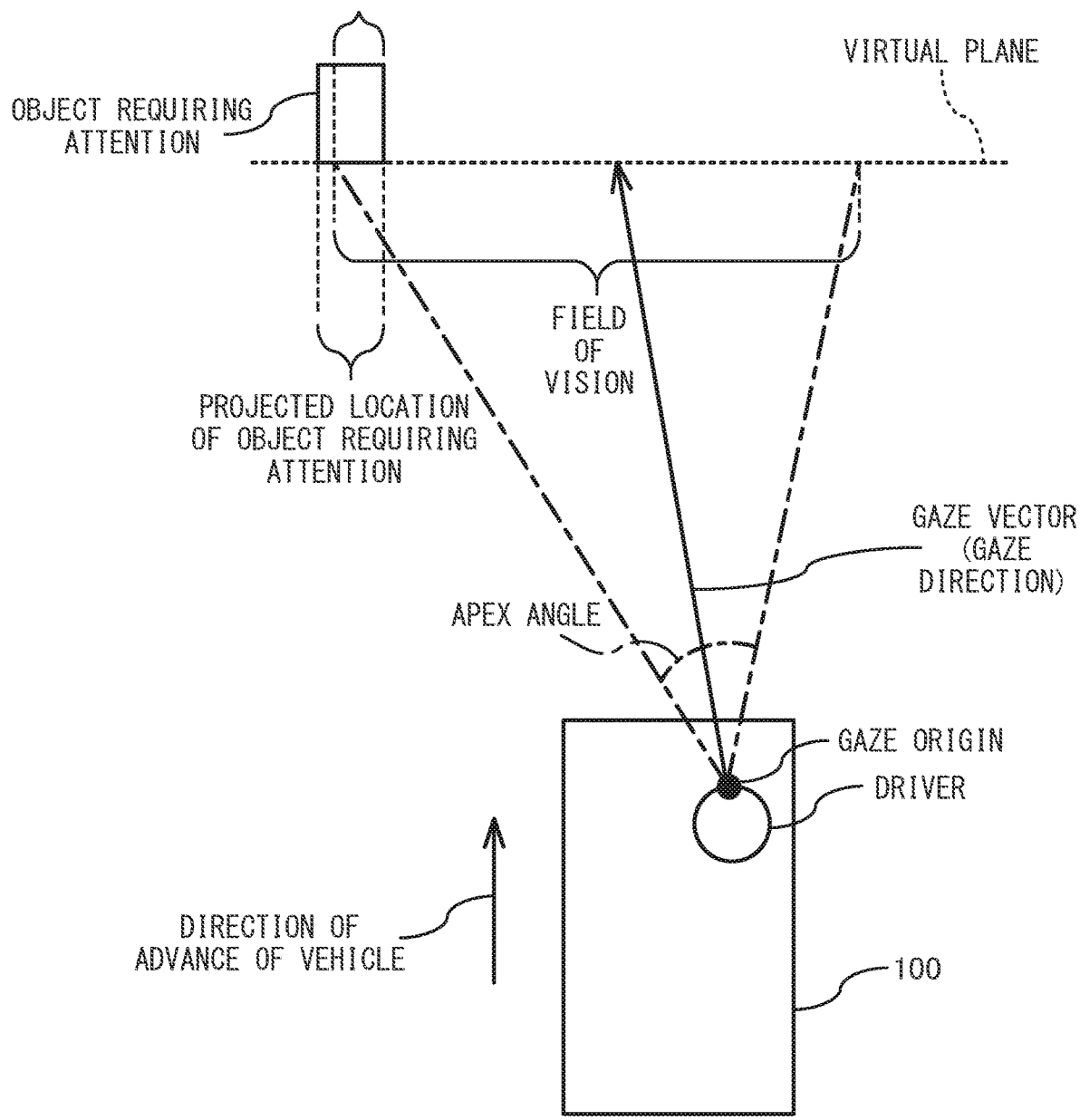
FIG. 5A is a view for explaining one example of a method for judging whether a driver recognizes an object requiring attention.

In the present embodiment, the control device 4, for example as shown in FIG. 5A, sets a virtual plane on which an object requiring attention is projected so as to be perpendicular to the direction of advance of the vehicle. If the field of vision of the driver overlaps the projected location of the object requiring attention on the virtual plane in a predetermined time period from when detecting an object requiring attention for greater than or equal to a predetermined recognition judgment time Trec, it judges that the driver has recognized the object requiring attention.

Figure 5B:
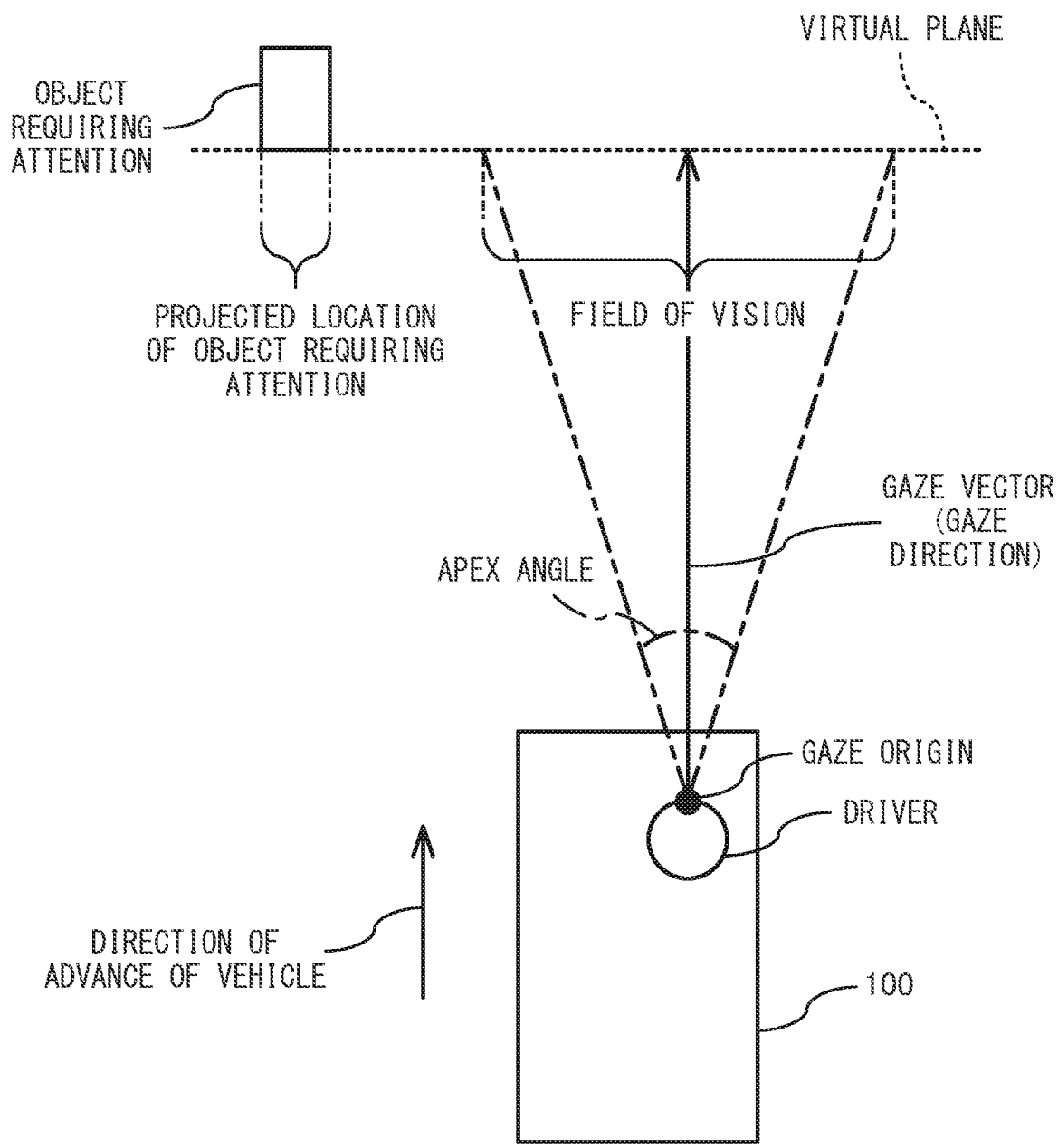
FIG. 5B is a view for explaining one example of a method for judging whether a driver recognizes an object requiring attention.

On the other hand, the control device 4, for example as shown in FIG. 5B, judges that the driver has not recognized the object requiring attention if the field of vision of the driver does not overlap the projected location of the object requiring attention on the virtual plane, in a predetermined time period from when detecting the object requiring attention for greater than or equal to the predetermined recognition judgment time Trec.

In FIG. 5A and FIG. 5B, the virtual plane is set at a position of the shortest distance from the gaze origin of the driver to the object requiring attention, but the invention is not limited to this. For example, it is possible to set it at a position in which the object requiring attention is included. Further, a virtual plane is set for each object requiring attention.

At step S6, the control device 4 notifies the driver about an object requiring attention through the output device 3. The method of notification is not particularly limited. For example, it may notify the driver that an object requiring attention has not been recognized by a voice announcement, may notify him or her by emitting a warning sound, may notify him or her by using graphic information or text information, or may notify him or her by a combination of the same.

According to the present embodiment explained above, the control device 4 for notifying the driver of the vehicle 100 (notification control device) detects objects requiring attention present in the surroundings of the vehicle 100 based on surrounding data showing the state of the surroundings of the vehicle 100, sets a field of vision of the driver based on driver data showing the state of the driver, when the number of objects requiring attention Nobj is less than or equal to a predetermined number Nth, respectively sets virtual planes on which the objects requiring attention are projected at the positions of the objects requiring attention so as to face the vehicle 100, notifies the driver to inform him or her that an object requiring attention is present if the field of vision of the driver does not overlap the projected location of the object requiring attention on the virtual plane for greater than or equal to a predetermined recognition judgment time during a predetermined period from when detecting the object requiring attention, and does not notify the driver when the number of objects requiring attention Nobj is larger than a predetermined number Nth.

Due to this, if there is a large number of objects requiring attention at the outside of the vehicle 100, the driver is no longer notified regarding an object requiring attention, therefore it is possible to keep a notification regarding an object requiring attention from being issued to the driver despite the driver being right of the middle of turning his or hers gaze to the objects requiring attention to obtain a grasp of them or despite having obtained a grasp of the objects requiring attention. Therefore, in the case where there is a large number of objects requiring attention at the outside of the vehicle 100, it is possible to keep the driver from ending up being unnecessarily warned.

Second Embodiment

Next, a second embodiment of the present invention will be explained. The present embodiment differs from the first embodiment on the point that it changes a recognition judgment time Trec in accordance with the number of objects requiring attention Nobj to keep warnings from being unnecessarily issued when there are a plurality of objects requiring attention at the outside of the vehicle 100. Below, this point of difference will be focused on for the explanation.

As explained above, if there are a plurality of objects requiring attention at the outside of a vehicle 100, it is assumed that the driver will turn his or hers gaze to all of the objects without omission to obtain a grasp of the positions etc. of those objects without fixing his or hers gaze on any one object among the plurality of objects requiring attention. That is, if the number of objects requiring attention Nobj increases, it is imagined that the time for visual recognition of the objects will become relatively shorter.

For this reason, in the case where the number of objects requiring attention Nobj is large, if not shortening the recognition judgment time Trec accordingly, despite a certain object requiring attention being visually recognized, since the visual recognition time (time when field of vision of driver overlaps the projected location of the object requiring attention) is short, it is liable to end up being judged that the object requiring attention has not been recognized. As a result, despite the object requiring attention being grasped, a notification will be issued regarding the object requiring attention and the driver is liable to end up feeling bothered by the notification.

Therefore, in the present embodiment, it was decided to change the recognition judgment time Trec corresponding to the number of objects requiring attention Nobj. Specifically, when the number of objects requiring attention Nobj is large, the recognition judgment time Trec is made to be shortened compared to when it is small. Below, referring to FIG. 6, one example of the processing for notification according to the present embodiment will be explained.

Figure 6:
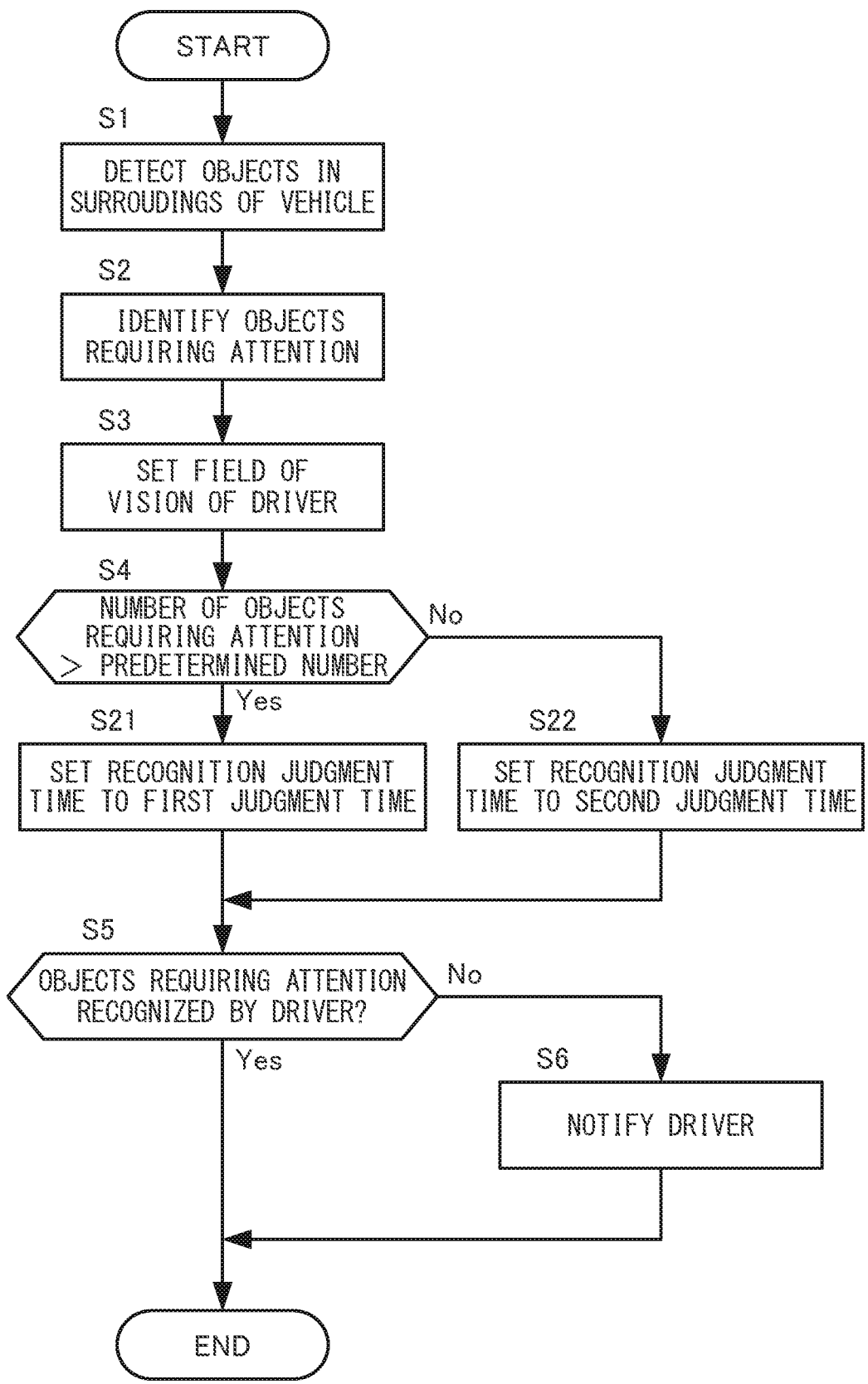
FIG. 6 is a flow chart for explaining details of processing for notification according to a second embodiment of the present invention.

FIG. 6 is a flow chart for explaining details of the processing for notification according to the present embodiment. In FIG. 6, the contents of the processing from step S1 to S6 are similar to the first embodiment, therefore here the explanations will be omitted.

At step S21, the control device 4 sets the recognition judgment time Trec to a predetermined first judgment time T1.

At step S22, the control device 4 sets the recognition judgment time Trec to a predetermined second judgment time T2.

The first judgment time T1 is made a value smaller than the second judgment time T2. Due to this, if the number of objects requiring attention Nobj is large, it is possible to shorten the recognition judgment time Trec, therefore it is possible to keep from ending up judging that a certain object requiring attention cannot be recognized despite visually recognizing that object requiring attention.

Note that the method of changing the recognition judgment time Trec is not limited to such a method. For example, it is also possible to make the recognition judgment time Trec smaller gradually or in steps the larger the number of objects requiring attention Nobj becomes.

According to the present embodiment explained above, the control device 4 (notification control device) for issuing a notification to the driver of the vehicle 100 identifies objects requiring attention present in the surroundings of the vehicle 100 based on surrounding data showing the state of the surroundings of the vehicle 100, sets the field of vision of the driver based on the driver data showing the state of the driver, sets virtual planes on which the objects requiring attention are projected at the positions of the objects requiring attention so as to face the vehicle 100, if, during a predetermined period from when detecting the objects requiring attention, the field of vision of the driver overlaps the projected locations of the objects requiring attention on the virtual planes for greater than or equal to the predetermined recognition judgment time Trec, the driver recognizes the objects requiring attention, if there are objects which the driver does not recognize among the objects requiring attention, a notification informing the driver that there are objects requiring attention is sent to him or her and, when the number of objects requiring attention Nobj is large, the recognition judgment time Trec is made shorter compared to when it is small.

In the present embodiment, when the number of objects requiring attention Nobj is less than or equal to the predetermined number Nth, the control device 4 makes the recognition judgment time Trec the second judgment time T2, while when the number of objects requiring attention Nobj is greater than the predetermined number Nth, it makes the recognition judgment time Trec the first judgment time T1 smaller than the second judgment time T2.

Due to this, if there is a large number of objects requiring attention at the outside of the vehicle, it is possible to shorten the recognition judgment time Trec, therefore it is possible to keep it from ending up being judged that a certain object requiring attention has not been recognized regardless of that object requiring attention being visually recognized. For this reason, it is possible to keep notifications regarding objects requiring attention from being sent to drivers regardless of the objects requiring attention being able to be grasped. That is, in the case where there is a large number of objects requiring attention at the outside of a vehicle, it is possible to keep the driver from ending up being unnecessarily warned.

Above, embodiments of the present invention were explained, but the above embodiments only show some of the examples of application of the present invention. They are not intended to limit the technical scope of the present invention to the specific constitutions of the embodiments.

For example, the computer program run in the control device 4 in the above embodiments (processing for notification) may also be provided in a form recorded in a computer readable portable recording medium such as a semiconductor memory, magnetic recording medium, or optical recording medium.

The invention claimed is:

1. A notification control device configured to notify a driver, wherein
the notification control device is configured to:
detect objects requiring attention present in surroundings of a vehicle based on surrounding data showing a situation in surroundings of the vehicle;
set a field of vision of the driver based on driver data showing a condition of the driver;
when the number of the objects is less than or equal to a predetermined number, respectively set virtual planes on which the objects are projected at positions of the objects so as to face the vehicle and notify the driver to inform him or her of the presence of an object requiring attention if the field of vision of the driver does not overlap a projected location of the object on the virtual plane during a predetermined period from when detecting that object for greater than or equal to a predetermined recognition judgment time; and,
when the number of the objects is larger than the predetermined number, not notify the driver in that way.

2. The notification control device according to claim 1, wherein
the notification control device is configured to correct the number of detected objects by a weighting coefficient set for each type of object.

3. A notification control device configured to notify a driver, wherein
the notification control device is configured to:
detect objects requiring attention present in surroundings of a vehicle based on surrounding data showing a situation in surroundings of the vehicle;
set a field of vision of the driver based on driver data showing a condition of the driver;
respectively set virtual planes on which the objects are projected at positions of the objects so as to face the vehicle and judge that an object has been recognized by the driver if the field of vision of the driver overlaps a projected location of the object on the virtual plane during a predetermined period from when detecting that object for greater than or equal to a predetermined recognition judgment time;
if there is an object not recognized by the driver among the detected objects, notify the driver to inform him or her of the presence of an object requiring attention; and
when the number of the objects detected is large, shorten the recognition judgment time compared to when it is small.

4. The notification control device according to claim 3, wherein
the notification control device is configured to:
make the recognition judgment time a second judgment time when the number of the objects is less than or equal to a predetermined number; and
make the recognition judgment time a first judgment time smaller than the second judgment time when the number of the objects is greater than the predetermined number.

5. A notification control method by a notification control device notifying information to a driver, wherein
the notification control method comprises:
detecting objects requiring attention present in surroundings of a vehicle based on surrounding data showing a situation in surroundings of the vehicle;
setting a field of vision of the driver based on driver data showing a condition of the driver;
when the number of the objects is less than or equal to a predetermined number, respectively setting virtual planes on which the objects are projected at positions of the objects so as to face the vehicle and notifying the driver to inform him or her of the presence of an object requiring attention if the field of vision of the driver does not overlap a projected location of the object on the virtual plane during a predetermined period from when detecting that object for greater than or equal to a predetermined recognition judgment time; and,
when the number of the objects is larger than the predetermined number, not notifying the driver in that way.

6. A notification control method by a notification control device notifying information to a driver, wherein
the notification control method comprises:
detecting objects requiring attention present in surroundings of a vehicle based on surrounding data showing a situation in surroundings of the vehicle;
setting a field of vision of the driver based on driver data showing a condition of the driver;
respectively setting virtual planes on which the objects are projected at positions of the objects so as to face the vehicle and judging that an object has been recognized by the driver if the field of vision of the driver overlaps a projected location of the object on the virtual plane during a predetermined period from when detecting that object for greater than or equal to a predetermined recognition judgment time;

if there is an object not recognized by the driver among the detected objects, notifying the driver to inform him or her of the presence of an object requiring attention; and when the number of the objects detected is large, shortening the recognition judgment time compared to when it is small.

* * * * *